(12) United States Patent
Wotzak

(10) Patent No.: US 10,823,080 B2
(45) Date of Patent: Nov. 3, 2020

(54) DUAL ACCESSORY GEARBOX

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 15/609,338

(22) Filed: May 31, 2017

(65) Prior Publication Data

US 2018/0347471 A1 Dec. 6, 2018

(51) Int. Cl.
*F02C 7/32* (2006.01)
*F02C 7/275* (2006.01)
*F16H 1/22* (2006.01)

(52) U.S. Cl.
CPC ............. *F02C 7/32* (2013.01); *F02C 7/275* (2013.01); *F05D 2260/4031* (2013.01); *F16H 1/222* (2013.01)

(58) Field of Classification Search
CPC .............. F02C 7/32; F02C 7/275; F16H 1/222
USPC ........................................................ 74/665 F
See application file for complete search history.

(56) References Cited

U.S. PATENT DOCUMENTS

| | | |
|---|---|---|
| 5,241,826 A | 9/1993 | Stearns |
| 5,694,765 A | 12/1997 | Hield et al. |
| 6,860,726 B2 | 3/2005 | Carter, III et al. |
| 7,805,947 B2 * | 10/2010 | Moulebhar ........... F01D 21/003 60/39.163 |
| 8,333,554 B2 | 12/2012 | Chaudhry |
| 8,347,637 B2 | 1/2013 | Suciu et al. |
| 8,490,410 B2 | 7/2013 | Suciu et al. |
| 9,062,611 B2 | 6/2015 | Sheridan |
| 9,297,314 B2 | 3/2016 | Cloft et al. |
| 9,664,070 B1 * | 5/2017 | Clauson ................. F01D 25/36 |
| 10,508,601 B2 * | 12/2019 | Sheridan ................ F02C 7/275 |
| 2002/0084120 A1 * | 7/2002 | Beasley ................... B60K 6/36 180/65.25 |
| 2009/0290976 A1 | 11/2009 | Suciu et al. |
| 2009/0302152 A1 * | 12/2009 | Knight .................... B64D 41/00 244/58 |
| 2012/0117982 A1 * | 5/2012 | Suciu ........................ F02C 7/32 60/802 |
| 2012/0317991 A1 | 12/2012 | Frost et al. |
| 2013/0125561 A1 | 5/2013 | Schwartz et al. |

(Continued)

*Primary Examiner* — Ha Dinh Ho
(74) *Attorney, Agent, or Firm* — Dority & Manning, P.A.

(57) ABSTRACT

The present disclosure is directed to a gas turbine engine including an engine shaft rotatable with at least one of a fan section, a compressor section, or a turbine section, and an accessory gearbox assembly including a towershaft, a first gearbox, a torque transfer assembly, and a second gearbox. The towershaft is rotatable with the engine shaft and extended therefrom and mechanically coupled to the first gearbox. The first gearbox transmits mechanical energy from the engine shaft via a first shaft defining a first end and a second end. The first shaft extends at the first end from the first gearbox and through the torque transfer assembly and coupled thereto. The first shaft extends from the torque transfer assembly to the second gearbox at the second end and is coupled thereto. The first gearbox and the second gearbox each are coupled to one or more gearbox accessories.

20 Claims, 4 Drawing Sheets

(56) References Cited

U.S. PATENT DOCUMENTS

| | | | |
|---|---|---|---|
| 2014/0090386 A1* | 4/2014 | Cloft | F02C 7/32 60/772 |
| 2014/0318144 A1* | 10/2014 | Lazzeri | F01D 21/18 60/772 |
| 2015/0128592 A1 | 5/2015 | Filiputti et al. | |
| 2015/0369132 A1 | 12/2015 | Roberge | |
| 2016/0281605 A1 | 9/2016 | Fert et al. | |
| 2016/0333792 A1 | 11/2016 | Viel et al. | |
| 2016/0341129 A1 | 11/2016 | Wotzak | |

* cited by examiner

DUAL ACCESSORY GEARBOX

FIELD

The present disclosure is related generally to gas turbine engine accessory gearboxes.

BACKGROUND

In gas turbine engines, accessory gearboxes are generally mechanically coupled to a gas turbine engine to drive several accessories (e.g., pumps, generators, blowers, etc.). Known accessory gearboxes often occupy substantial space within an engine nacelle, thereby increasing engine size and weight, and decreasing efficiency of the apparatus to which it is attached. Therefore, there is a need for an accessory gearbox that may decrease size and weight of the engine.

BRIEF DESCRIPTION

Aspects and advantages of the invention will be set forth in part in the following description, or may be obvious from the description, or may be learned through practice of the invention.

The present disclosure is directed to a gas turbine engine including an engine shaft rotatable with at least one of a fan section, a compressor section, or a turbine section, and an accessory gearbox assembly including a towershaft, a first gearbox, a torque transfer assembly, and a second gearbox. The towershaft is rotatable with the engine shaft and extended therefrom and mechanically coupled to the first gearbox. The first gearbox transmits mechanical energy from the engine shaft via a first shaft defining a first end and a second end. The first shaft extends at the first end from the first gearbox and through the torque transfer assembly and coupled thereto. The first shaft extends from the torque transfer assembly to the second gearbox at the second end and is coupled thereto. The first gearbox and the second gearbox each are coupled to one or more gearbox accessories. In various embodiments, the torque transfer assembly defines one or more gearbox accessories.

In various embodiments, the engine shaft and towershaft transmit mechanical energy to the first gearbox in serial arrangement, and wherein the torque transfer assembly transmits mechanical energy to the gearbox accessories of the second gearbox in serial arrangement. In one embodiment, the one or more gearbox accessories of the first gearbox receive mechanical energy in parallel arrangement relative to one another, and the one or more gearbox accessories of the second gearbox receive mechanical energy in parallel arrangement relative to one another.

In various embodiments, the first shaft defines a drive shaft and a quill shaft. The drive shaft is disposed at least partially within the quill shaft, and the first shaft further includes a locking mechanism to engage or disengage the drive shaft from the quill shaft. In one embodiment, the first shaft includes a stop collar, in which the stop collar sets a maximum lateral movement of the drive shaft relative to the quill shaft. In another embodiment, the drive shaft and the quill shaft engage or disengage within the torque transfer assembly. In yet another embodiment, the locking mechanism disengages the first gearbox from the torque transfer assembly. In still another embodiment, the locking mechanism disengages the second gearbox from the torque transfer assembly.

In one embodiment, the one or more gearbox accessories includes a lube pump, a starter, a fuel metering unit, a permanent magnetic alternator, or a blower, or combinations thereof.

In various embodiments, the torque transfer assembly is defined at least partially within a housing. In one embodiment, the torque transfer assembly defines a gearbox accessory within the housing. In another embodiment, the torque transfer assembly defines at least a portion of the first shaft within the housing. In various embodiments, the torque transfer assembly defines at least a portion of the quill shaft and the drive shaft within the housing. In still another embodiment, the housing defines one or more maintenance orifices.

In one embodiment, the one or more gearbox accessories coupled to the first gearbox or the second gearbox extends approximately perpendicular to the first shaft.

In another embodiment, the one or more gearbox accessories is disposed forward or aft of an axis of rotation of the gas turbine engine.

In yet another embodiment, the first shaft extends approximately tangential relative to the engine shaft.

Another aspect of the present disclosure is directed to a method of operating an accessory gearbox on a gas turbine engine. The method includes transmitting mechanical energy through a first gearbox via a second shaft mechanically coupled to the first gearbox and an engine shaft; transmitting mechanical energy through a torque transfer assembly via a first shaft mechanically coupled to the first gearbox; transmitting mechanical energy through a second gearbox via the first shaft; and driving one or more gearbox accessories connected to the first gearbox, the second gearbox, or both.

In one embodiment, the method further includes transmitting mechanical energy from the engine shaft that is rotatable with at least one of a fan section, a compressor section, or a turbine section, and rotatable with the second shaft.

In still another embodiment, the method further includes transmitting mechanical energy to the first shaft from a starter that is connected to the first gearbox, the second gearbox, or torque transfer assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
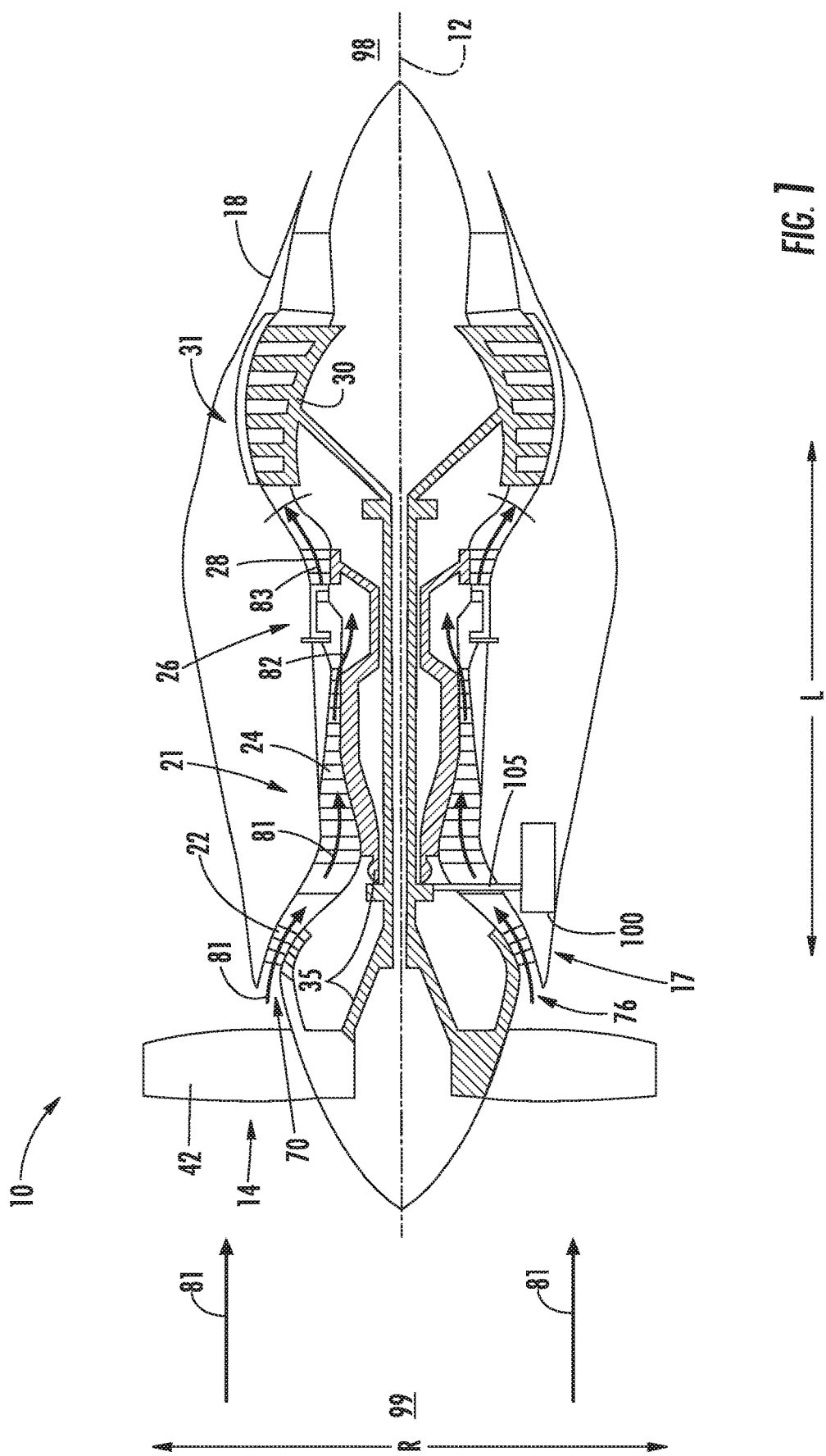
FIG. 1 is a schematic cross sectional view of an exemplary gas turbine engine incorporating an exemplary embodiment of an accessory gearbox assembly according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A gas turbine engine is generally provided that includes an accessory gearbox assembly that may decrease size and weight of the engine and enable accessories to be dismounted independently of removing the accessory gearbox assembly. The gas turbine engine includes an engine shaft rotatable with a fan section a compressor section, and/or a turbine section of the engine, and a towershaft extended from the from the engine shaft. The towershaft is coupled to a first gearbox of the accessory gearbox assembly and transmits mechanical energy from the engine shaft. A first shaft extends through a torque transfer assembly from the first gearbox. The first gearbox is mechanically coupled to a first end of the first shaft disposed and a second gearbox is mechanically coupled to a second end, and the torque transfer assembly is mechanically coupled to the first shaft between the first gearbox and the second gearbox. One or more gearbox accessories are coupled to each of the first and second gearbox. The torque transfer assembly may define a gearbox accessory.

In various embodiments, the accessories include one or more of a pump, a blower, a starter, an alternator and/or generator, and/or a heat exchanger. The accessory gearbox assembly enables mount and dismount of one or more accessories from the first and/or second gearboxes while leaving the torque transfer assembly, the first gearbox, and/or the second gearbox attached to the engine. The arrangement as shown and described herein enables smaller, lighter gearboxes to drive one or more accessories. Furthermore, the arrangement as shown and described may enable a single person to service, mount, and dismount the accessories and/or gearboxes of the accessory gearbox assembly due to smaller, lighter gearboxes and/or accessories. For example, various standards, regulations, requirements, and/or guidelines, including, but not limited to, those promulgated by the Occupational Safety and Health Administration or the National Institute for Occupational Safety and Health, may limit the weight a single person may carry as less than approximately 23 kilograms.

Referring now to the drawings, FIG. 1 are schematic cross sectional views of exemplary gas turbine engines 10 (herein referred to as "engine 10"), shown as a high bypass turbofan engine, incorporating an exemplary embodiment of an accessory gearbox assembly 100 according to an aspect of the present disclosure. Although further described below with reference to a turboprop engine, the present disclosure is also applicable to turbomachinery in general, including propfan, turbojet, turbofan, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L and an upstream end 99 and a downstream end 98 along the longitudinal direction L. The upstream end 99 generally corresponds to an end of the engine 10 along the longitudinal direction L from which air enters the engine 10 and the downstream end 98 generally corresponds to an end at which air exits the engine 10, generally opposite of the upstream end 99 along the longitudinal direction L.

In general, the engine 10 may include a substantially tubular or rectangular outer frame 18 that defines an annular inlet 76 defining a core flowpath 70 into a compressor section 21, combustion section 26, and turbine section 31 over each of which the frame 18 at least partially encases. The frame 18 further houses or carries the accessory gearbox assembly 100. Generally, the engine 10 defines, in serial flow arrangement from the upstream end 99 to the downstream end 98, a fan or propeller assembly 14, the compressor section 21, the combustion section 26, and the turbine section 31. In the embodiment shown in FIG. 1, the compressor section 21 defines a first compressor 22 and a second compressor 24 in serial flow arrangement.

In the embodiment shown in FIG. 1, the engine 10 defines a two spool gas turbine engine including two engine shafts 35. As shown in FIG. 1, the first compressor 22 defines a low pressure compressor (LPC) coupled to the engine shaft 35 defined as a low pressure (LP) shaft and the second compressor 24 defines a high pressure compressor (HPC) coupled to the engine shaft 35 defined as a high pressure (HP) shaft. A second turbine 28, generally defining an HP turbine, is coupled to engine shaft 35 defining the HP shaft that is further coupled to the second compressor 24. A first turbine 30, generally defining an LP turbine, may be coupled to the engine shaft 35 defining the LP shaft that is further coupled to the first compressor 22.

In other embodiments, the engine 10 may define a three spool gas turbine engine including three engine shafts 35 (e.g., an LP shaft, an intermediate pressure (IP) shaft, and an HP shaft). In still other embodiments, the engine 10 may define a plurality of engine shafts 35 extended generally along the longitudinal direction L that transmit energy from the turbine section 31 to the compressor section 21 and/or fan section 14. In various embodiments, it should be appreciated that the fan or propeller 14 may define a propeller assembly including a reduction gearbox and/or pitch change mechanism.

Figure 2:
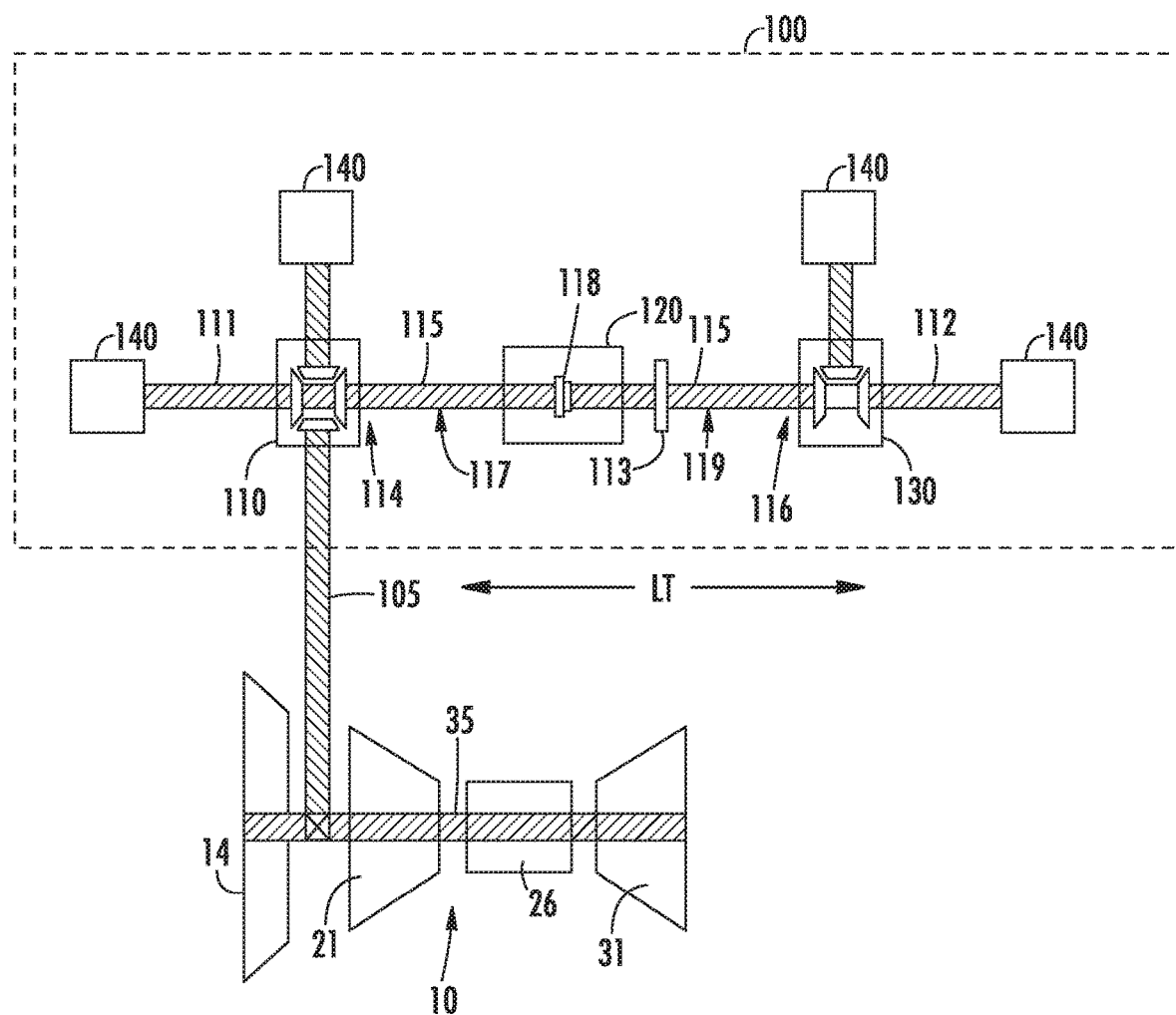
FIG. 2 is an exemplary diagram of an accessory gearbox assembly according to an aspect of the present disclosure.

Referring to FIG. 2, an exemplary diagram of an accessory gearbox assembly 100 is generally provided. Referring now to FIGS. 1-2, the accessory gearbox assembly 100 is coupled to the engine shaft 35 via a towershaft 105 rotatable with and extended from the engine shaft 35. In the embodiment shown in FIG. 1, the towershaft 105 is generally extended at least partially along the radial direction R from the engine shaft 35. The towershaft 105 may extend generally perpendicular to the engine shaft 35, such as shown in FIG. 1. In other embodiments, the towershaft 105 may extend at an acute angle relative to the axial centerline 12 such that the accessory gearbox assembly 100 is disposed forward or aft of the engine shaft 35 along the longitudinal direction L.

The towershaft 105 is further coupled to a first gearbox 110 of the accessory gearbox assembly 100. The towershaft 105 transmits mechanical energy to and from the engine shaft 35 through the first gearbox 110. The accessory gearbox assembly 100 generally includes at least a first shaft 115 defining a first end 114 and a second end 116. The first shaft 115 extends from the first end 114 mechanically coupled to the first gearbox 110 and through a torque transfer assembly 120, to which the first shaft 115 is also mechanically coupled. The second end 116 of the first shaft 115 is mechanically coupled to a second gearbox 130.

One or more gearbox accessories 140 are coupled to each of the first gearbox 110 and the second gearbox 130. In various embodiments, the torque transfer assembly 120 defines one or more gearbox accessories 140. Gearbox accessories 140 may include, but are not limited to, one or more of pumps, boosters, scavenges, alternators, generators, starters, and/or blowers. The gearbox accessories 140 may include a fluid, such as fuel, oil, air, hydraulic fluid, or combinations thereof, through which are flowed, pressurized, and/or thermally conditioned. For example, in various embodiments, the torque transfer assembly 120 includes one or more gearbox accessories 140 that define, but are not limited to, an oil or fuel boost pump, a fuel metering unit, an air, fuel, hydraulic fluid, and/or oil heat exchanger, or combinations thereof. The torque transfer assembly 120 transmits power or torque between the first gearbox 110 and the second gearbox 130. In still various embodiments, the one or more gearbox accessories 140 coupled to the first and second gearboxes 110, 130 include a lube pump, a starter, a fuel metering unit, a permanent magnet alternator/generator, a variable frequency generator, or a blower, or combinations thereof.

Each of the first gearbox 110 and the second gearbox 130 may include a plurality of gears 107 coupled within each gearbox 110, 130 to transmit and direct mechanical energy from the first shaft 115. In various embodiments, at least some of the gears 107 are coupled onto the first shaft 115 and in arrangement with other gears 107 to transmit mechanical energy to the gearbox accessories 140.

Referring still to FIGS. 1-2, during operation of the engine 10, the accessory gearbox assembly 100 may define a gearbox accessory 140 as a starter, in which the starter provides mechanical energy to the engine shaft 35 through the first or second gearbox 110, 130, through the first shaft 115, and, in various embodiments, through the torque transfer assembly 120. The mechanical energy from the starter begins an initial rotation of the engine shaft 35 and the portions of the compressor section 21 and turbine section 31 to which they are attached. The initial rotation of the engine shaft 35 consumes a volume of air as indicated schematically by arrows 81 enters the engine 10 through the associated inlet 76 defined in the frame 18. As the air 81 passes across fan or propeller blades 42 of the fan or propeller assembly 14, a portion of the air is directed into the core flowpath 70 defined through the compressor section 21, the combustion section 26, and the turbine section 31. Air 81 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 83. The combustion gases 83 flow into and through the turbine section 31, causing rotary members of the turbine section 31 to rotate and support operation of respectively coupled rotary members in the compressor section 21 and/or fan or propeller assembly 14.

Referring to the embodiments shown in FIGS. 1-2, the engine shaft 35 and the towershaft 105 together transmit mechanical energy to the first gearbox 110 in serial arrangement. The torque transfer assembly 120 transmits mechanical energy to the gearbox accessories 140 of the first gearbox 110 and the second gearbox 130 in parallel arrangement. In various embodiments, the one or more gearbox accessories 140 of the first gearbox 110 receive or transmit mechanical energy from/to the first gearbox 110 in parallel arrangement relative to one another. The one or more gearbox accessories 140 of the second gearbox 130 receive or transmit mechanical energy from/to the second gearbox 130 in parallel arrangement relative to one another.

Figure 3:
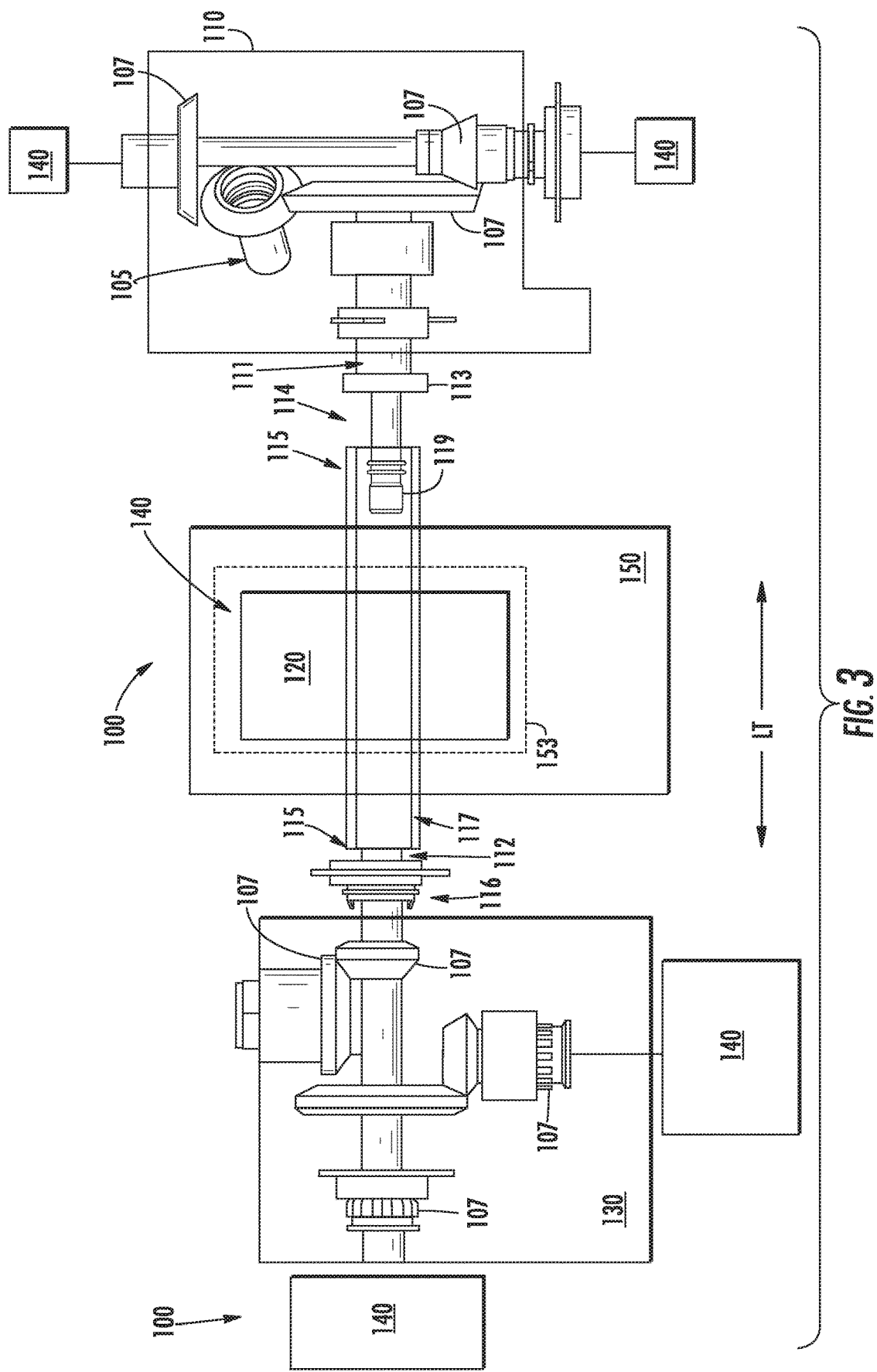
FIG. 3 is an exploded view of an accessory gearbox assembly according to an aspect of the present disclosure.

Referring now to FIG. 3, an exploded view of another exemplary embodiment of the accessory gearbox assembly 100 is generally provided. In the embodiment shown in FIGS. 2-3, the first shaft 115 defines a drive shaft 117 and a quill shaft 119. The drive shaft 117 is disposed at least partially within the quill shaft 119. The drive shaft 117 may be disposed at least partially within the quill shaft 119. The first shaft 115 may further include a locking mechanism 118 to engage or disengage the drive shaft 117 from the quill shaft 119 or the gearbox accessories 140 from the gearbox 110, 130. The locking mechanism 118 may include a clamp or collar disposed on the first shaft 115 and/or within the gearboxes 110, 130. In one embodiment, the first shaft 115 further includes a stop collar 113 that sets a maximum lateral movement of the drive shaft 117 relative to the quill shaft 119. For example, as shown in FIGS. 2-3, the drive shaft 117 may engage or disengage from the quill shaft 119 along lateral direction LT. The stop collar 113 may define a maximum distance along lateral direction LT to which the drive shaft 117 may displace within the quill shaft 119. The drive shaft 117 and the quill shaft 119 may further engage or disengage within and from the torque transfer assembly 120. For example, the locking mechanism may engage/disengage the first gearbox 110 and/or the second gearbox 130 from the torque transfer assembly 120. As such, the first shaft 115 enables assembly/disassembly of the torque transfer assembly 120 from the first gearbox 110 and the second gearbox 130 without assembling/disassembling the entire accessory gearbox assembly 100 to/from the engine 10.

The accessory gearbox assembly 110 further includes a first gearbox shaft 111 driving the first gearbox 110 and its gearbox accessories 140 and a second gearbox shaft 112 driving the second gearbox 130 and its gearbox accessories 140. The first gearbox shaft 111 and the second gearbox shaft 112 are generally co-axial with the first shaft 115 defining the drive shaft 117 and the quill shaft 119. The drive shaft 115 may be moved into the first gearbox shaft 111, the second gearbox shaft 112, or both generally along the lateral direction LT or to the quill shaft 119 to remove the torque transfer assembly 120. In various embodiments, the first gearbox 110 and the second gearbox 130 are generally fixed within the accessory gearbox assembly 110 such that the torque transfer assembly 120 is generally only displaced (e.g., removed) during maintenance of the accessory gearbox assembly 110.

The accessory gearbox assembly 100 may further include a housing 150 defined around at least partially around the torque transfer assembly 120. The torque transfer assembly 120 is defined at least partially within the housing 150. The torque transfer assembly 120 is generally supported by the first gearbox 110 and the second gearbox 130.

The housing 150 and/or first or second gearboxes 110, 130 may further define one or more maintenance orifices 153 through which a person may access the torque transfer assembly 120 and/or the first shaft 115. The maintenance orifices 153 may enable access to the first shaft 115 to disengage the drive shaft 117 from the quill shaft 119.

Referring still to FIGS. 2-3, one or more gearbox accessories 140 may extend adjacent to at least a portion of the housing 150. In one embodiment, the gearbox accessories 140 of the first gearbox 110 and/or the second gearbox 130 extend approximately perpendicular to the first shaft 115. In various embodiments, the first shaft 115 extends generally tangential to the engine shaft 35.

In still various embodiments, the accessory gearbox assembly 100 may be disposed within the frame 18. For example, in one embodiment, the one or more of the gearbox accessories 140 may be disposed forward or aft of an axis of rotation of the engine 10. The accessory gearbox assembly 100 may be disposed forward or aft of the compressor section 21 or turbine section 31 via the towershaft 105 extended from the engine shaft 35. The accessory gearbox assembly 100 may be disposed at a corner or edge 17 of the frame 18. More specifically, one or more of the gearboxes 110, 130 may be disposed in the corner or edge 17 of the frame 18. It should be appreciated that in other embodiments the accessory gearbox assembly 100 may be housed within a nacelle or fan case of a turbofan engine.

Figure 4:
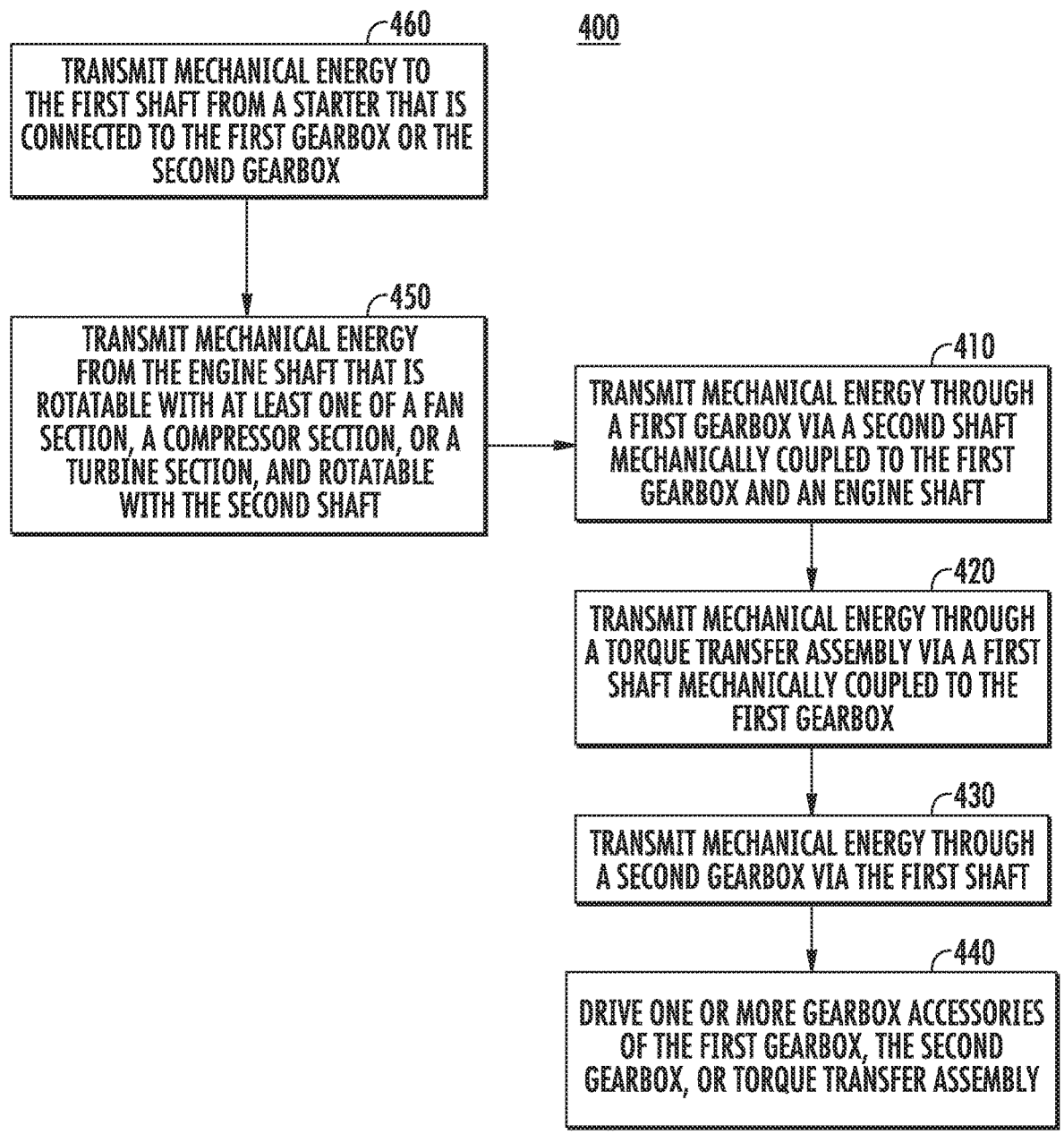
FIG. 4 is flowchart outlining an exemplary method of operating the accessory gearbox assembly shown and described in regard to FIGS. 1-3.

Referring now to FIG. 4, a flowchart outlining exemplary steps of a method of operating an accessory gearbox assembly 400 is generally provided (hereinafter referred to as "method 400"). The accessory gearbox assembly is configured substantially similarly as described and shown in regard to FIGS. 1-3 and its various embodiments. FIG. 4 depicts steps performed in a particular order for the purposes of illustration and discussion. Those of ordinary skill in the art, using the disclosures provided herein, will understand that various steps of any of the methods disclosed herein may be adapted, modified, rearranged, omitted, or expanded in various ways without deviating from the scope of the present disclosure.

The method 400 includes at 410 transmitting mechanical energy through a first gearbox via a second shaft mechanically coupled to the first gearbox and an engine shaft; at 420 transmitting mechanical energy through a torque transfer assembly via a first shaft mechanically coupled to the first gearbox; at 430 transmitting mechanical energy through a second gearbox via the first shaft; and at 440 driving one or more gearbox accessories connected to the first gearbox, the second gearbox, or both. In various embodiments at 440, driving one or more gearbox accessories includes driving the torque transfer assembly defining one or more gearbox accessories.

In various embodiments at 410, transmitting mechanical energy through a first gearbox via a second shaft includes transmitting mechanical energy in series through the second shaft (e.g., the towershaft 105) and the engine shaft (e.g., the engine shaft 35). In still various embodiments, transmitting mechanical energy via the first shaft (e.g., first shaft 115) through a torque transfer assembly at 420 and through a second gearbox at 430 includes transmitting mechanical energy in parallel to the first gearbox (e.g., the first gearbox 110) and the second gearbox (e.g., the second gearbox 130).

In yet various embodiments, driving one or more accessories (e.g., gearbox accessories 140) connected to the first gearbox includes transmitting mechanical energy in parallel to each accessory of the first gearbox. In another embodiment, driving one or more accessories connected to the second gearbox includes transmitting mechanical energy in parallel to each accessory of the second gearbox. For example, mechanical energy transmitted through the first shaft and the first gearbox coupled to a plurality of gearbox accessories may disengage from one accessory without affecting transmission of mechanical energy through another gearbox accessory coupled to the first gearbox. Similarly, mechanical energy transmitted through the first shaft and the second gearbox coupled to a plurality of gearbox accessories may disengage from one accessory without affecting transmission of mechanical energy through another gearbox accessory coupled to the second gearbox.

In one embodiment, the method 400 at 450 further includes transmitting mechanical energy from the engine shaft that is rotatable with at least one of a fan section, a compressor section, or a turbine section, and rotatable with the second shaft.

In another embodiment, the method 400 at 460 further includes transmitting mechanical energy to the first shaft from a starter that is connected to the first gearbox or the second gearbox.

In various embodiments, the method 400 transmitting mechanical energy includes rotating one or more of the engine shaft, the second shaft, or the first shaft.

It should be appreciated that the various embodiments of the accessory gearbox assembly 100 and methods 400 shown and described herein include transmission of mechanical energy through one or more components, in which transmissions through one or more components includes transmitting to the engine shaft 35 from one or more gearbox accessories 140 (e.g., a gearbox accessory 140 defining a starter) and transmitting from the engine shaft 35 to one or more gearbox accessories 140.

The structures and methods shown in FIGS. 1-4 and described herein may enable mount and dismount of one or more gearbox accessories 140 from the first and/or second gearboxes 110, 130 while leaving the torque transfer assembly 120, the first gearbox 110, and/or the second gearbox 130 attached to the engine 10. The structures and methods generally provided may further enable mount and dismount of the first and/or second gearbox 110, 130 from the torque transfer assembly 120 attached to the engine 10. The arrangement as shown and described herein enables smaller, lighter gearboxes 110, 130 to drive one or more gearbox accessories 140. Furthermore, the arrangement as shown and described may enable a single person to service, mount, and dismount the gearbox accessories 140, the torque transfer assembly 120, and/or gearboxes 110, 130 of the accessory gearbox assembly 100 due to smaller, lighter gearboxes and/or accessories.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, the gas turbine engine comprising:
 an engine shaft rotatable with at least one of a fan section, a compressor section, or a turbine section; and
 an accessory gearbox assembly comprising a towershaft, a first gearbox, a torque transfer assembly, and a second gearbox,
 wherein the towershaft is rotatable with the engine shaft and extended therefrom and mechanically coupled to the first gearbox,
 wherein the first gearbox transmits mechanical energy from the engine shaft via a first shaft defining a first end and a second end,
 wherein the first shaft extends at the first end from the first gearbox and through the torque transfer assembly and coupled thereto,
 wherein the first shaft extends from the torque transfer assembly to the second gearbox at the second end and coupled thereto, and
 wherein the first gearbox and the second gearbox each are coupled to one or more gearbox accessories.

2. The gas turbine engine of claim 1, wherein the torque transfer assembly defines one or more gearbox accessories.

3. The gas turbine engine of claim 1, wherein the accessory gearbox assembly further comprises a first gearbox shaft and a second gearbox shaft, each of the first gearbox shaft and the second gearbox shaft generally co-axial with the first shaft.

4. The gas turbine engine of claim 3, wherein the first shaft defining a drive shaft and a quill shaft is configured to displace at least partially within the first gearbox shaft and the second gearbox shaft such that the torque transfer assembly is disengaged from the first gearbox and the second gearbox.

5. The gas turbine engine of claim 1,
 wherein the first shaft defines a drive shaft and a quill shaft,
 wherein the drive shaft is disposed at least partially within the quill shaft, and
 wherein the first shaft further comprises a locking mechanism to engage or disengage the drive shaft from the quill shaft.

6. The gas turbine engine of claim 5,
 wherein the first shaft comprises a stop collar, and
 wherein the stop collar sets a maximum lateral movement of the drive shaft relative to the quill shaft.

7. The gas turbine engine of claim 5, wherein the drive shaft and the quill shaft engage or disengage within the torque transfer assembly.

8. The gas turbine engine of claim 5, wherein the locking mechanism disengages the first gearbox from the torque transfer assembly.

9. The gas turbine engine of claim 5, wherein the locking mechanism disengages the second gearbox from the torque transfer assembly.

10. The gas turbine engine of claim 1, wherein the one or more gearbox accessories includes a lube pump, a starter, a fuel metering unit, a permanent magnetic alternator, or a blower, or combinations thereof.

11. The gas turbine engine of claim 1, wherein the torque transfer assembly is defined at least partially within a housing.

12. The gas turbine engine of claim 11, wherein the housing defines one or more maintenance orifices.

13. The gas turbine engine of claim 1,
 wherein the engine shaft and towershaft transmit mechanical energy to the first gearbox in serial arrangement, and
 wherein the torque transfer assembly transmits mechanical energy to the gearbox accessories of the second gearbox in serial arrangement.

14. The gas turbine engine of claim 13,
 wherein the one or more gearbox accessories of the first gearbox receive mechanical energy in parallel arrangement relative to one another, and
 wherein the one or more gearbox accessories of the second gearbox receive mechanical energy in parallel arrangement relative to one another.

15. The gas turbine engine of claim 1, wherein the one or more gearbox accessories coupled to the first gearbox or the second gearbox extends approximately perpendicular to the first shaft.

16. The gas turbine engine of claim 1, wherein the one or more gearbox accessories is disposed forward or aft of an axis of rotation of the gas turbine engine.

17. The gas turbine engine of claim 1, wherein the first shaft extends approximately tangential relative to the engine shaft.

18. A method of operating an accessory gearbox on a gas turbine engine, the method comprising:
 transmitting mechanical energy through a first gearbox via a towershaft mechanically coupled to the first gearbox and an engine shaft;
 transmitting mechanical energy through a torque transfer assembly via a first shaft that is mechanically coupled to the first gearbox;
 transmitting mechanical energy through a second gearbox via the first shaft that defines a first end and a second end, that extends at the first end from the first gearbox and through the torque transfer assembly and coupled thereto, and that extends from the torque transfer assembly to the second gearbox at the second end and coupled thereto; and
 driving one or more gearbox accessories of the first gearbox, the second gearbox, and the torque transfer assembly.

19. The method of claim 18, further comprising:
 transmitting mechanical energy from the engine shaft that is rotatable with at least one of a fan section, a compressor section, or a turbine section, and rotatable with the towershaft.

20. The method of claim 18, further comprising:
 transmitting mechanical energy to the first shaft from a starter that is connected to the first gearbox, the second gearbox, or torque transfer assembly.

* * * * *